Apr. 10, 1923.
E. M. SIMPSON ET AL
1,451,121
TIRE REPAIR DEVICE
Filed May 11, 1922
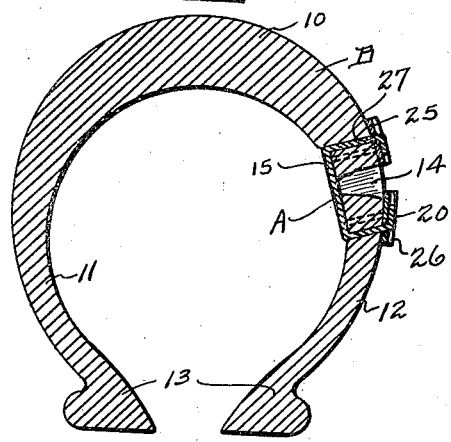
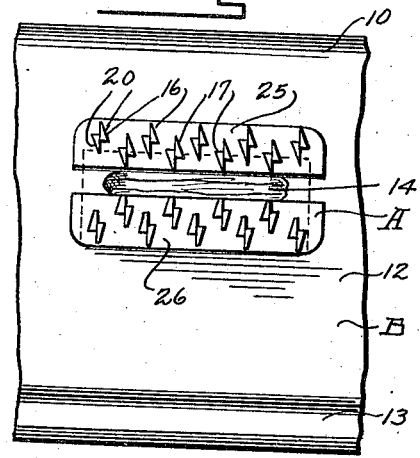
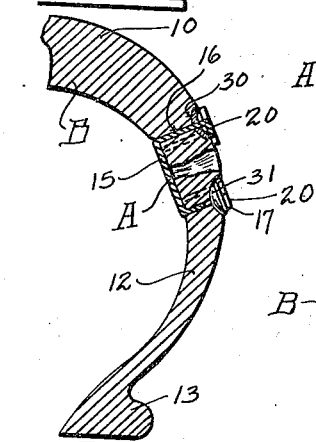
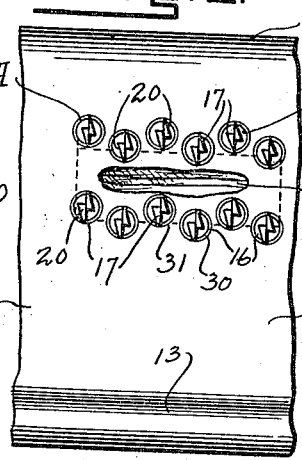
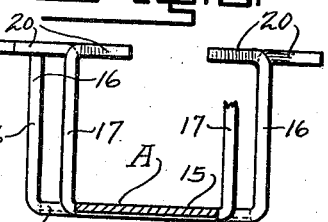
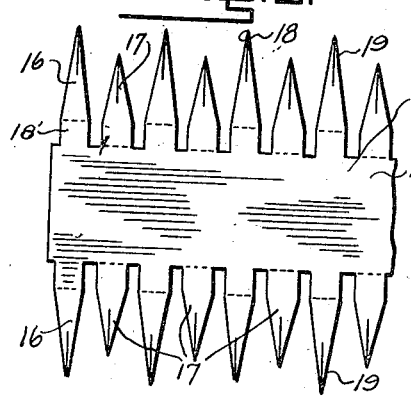
Edith M. Simpson
and James H. Buckles
Inventors
By Lancaster and Allwine
Attorneys Patented Apr. 10, 1923.

1,451,121

UNITED STATES PATENT OFFICE.

EDITH M. SIMPSON AND JAMES H. BUCKLES, OF NIGHTHAWK, WASHINGTON.

TIRE-REPAIR DEVICE.

Application filed May 11, 1922. Serial No. 560,176.

*To all whom it may concern:*

Be it known that we, EDITH M. SIMPSON and JAMES H. BUCKLES, citizens of the United States, residing at Nighthawk, in the county of Okanogan and State of Washington, have invented certain new and useful Improvements in Tire-Repair Devices, of which the following is a specification.

This invention relates to vehicle tires, and the primary object of this invention is to provide a novel device for repairing blow outs in tire casings, the device being so constructed as to effectively cover the blow out and to prevent the enlarging of the blow out or the weakening of the casing proper or fabric around the blow out.

Another object of the invention is the provision of a blow out repairing device including a body for overlying the blow out, a plurality of bendable tongues for insertion through the tire casing on each side of the blow out, and a retaining device for the bendable tongues to prevent the same from being accidentally withdrawn from out of the tire casing.

A further object of the invention is the provision of a blow out repair device for tire casings embodying a flat metallic body weakened at predetermined points, so that the said body can be readily broken into sections to permit the body to conform to the size of the blow out.

A further object of the invention is to provide a blow out repair device for tire casings embodying a flat metallic plate weakened at predetermined points and having a plurality of penetrating tongues formed on each longitudinal edge thereof arranged in stepped relation, the penetrating tongues being of novel construction, so as to permit the terminals thereof to be bent at different angles into engagement with the retaining members for the tongues, in order to effectively prevent the loss of said repair device.

A still further object of the invention is to provide an improved blow out repair device for tire casings of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a transverse section through a tire casing and repair device, showing the same applied to a blow out in the tire casing.

Figure 2 is a fragmentary side elevation of a tire casing, showing the improved repair device applied to a blow out therein.

Figure 3 is a transverse section through a tire casing and the improved repair device, showing a modified form of retaining member for the said device.

Figure 4 is a fragmentary elevation of a tire casing, showing the improved repair device applied to a blow out therein and illustrating the modified form of retaining members for the said device.

Figure 5 is an enlarged transverse section through the repair device.

Figure 6 is a plan view of the device prior to the bending up of the penetrating prongs.

Figure 7 is an enlarged bottom plan view of the improved repair device, showing prongs or tongues bent up into their extended position.

Figure 8 is a detail plan view of one of the modified forms of retaining members utilized for preventing the accidental withdrawal of the penetrating prongs or tongues from a tire casing after the improved repair device has been applied thereto.

Referring to the drawings in detail, wherein similar reference characters designate corresponding parts throughout the several views, the letter A generally indicates the improved repair device; and B, a tire casing with which the same can be associated.

It is to be understood, of course, that the tire casing B forms no part of the invention and has been merely shown to illustrate the use and the method of applying the improved tire repair device thereto. As shown, the casing B includes the tread 10, the side walls 11 and 12, and the beads 13. The wall 12 has been shown provided with a blow out opening 14, which is adapted to be closed or repaired by the improved device A.

The improved device A is preferably formed of sheet metal, such as copper, brass or some other similar soft substance, and as clearly shown in Figures 5, 6, and 7 of the drawings, the same includes the longitudinally extending flattened body 15. This body 15 has formed on its longitudinal edges, a plurality of penetrating prongs or tongues 16 and 17. The penetrating prongs or tongues 16 are formed relatively longer than the penetrating prongs or tongues 17 and it can be seen that the relatively short tongues 17 are bent directly upward from the plate 15, while the tongues 16 are extended a slight distance, as at 18', from the longitudinal edges of the plate 15, prior to being bent outwardly. All of the tongues 16 and 17 terminate in the same plane, however, and have their terminals sharpened as at 18. By forming the tongues 16 and 17 in the manner described, these tongues will be arranged in staggered relation and thus effectively prevent the weakening of the tire casing along one unbroken line. In order to prevent the pulling up of the prongs 16 and 17 from out of engagement with the tire casing when the improved repair device has been applied thereto, it is preferred to split the tongues 16 and 17 longitudinally as at 19 and bend the portions on opposite sides of the split portion in opposite directions as at 20 as shown in Figures 2, 3, 4, and 5.

The outer face of the plate 15 is preferably weakened at predetermined spaced points by transverse grooves 21 and it can be seen that these grooves 21 divide the body 15 into a plurality of sections, which can be readily broken off of the plate 15 when so desired. This allows the plate 15 to be broken, so that a plate of the desired size can be used for repairing the blow out opening. If the opening is relatively small, it is of course, merely necessary to use a small plate, but if the blow out opening is relatively large, it will be necessary to use a relatively long plate. If the blow out opening is of such a length that a single plate will not completely cover the same, other independent sections may be utilized at each end of the main plate.

Retaining devices can be utilized to prevent the withdrawing of the prongs or penetrating tongues 16 and 17 from the carcass of a tire casing when the improved device is applied thereto and to also prevent injury of the casing by the bent portions 20 of the said penetrating prongs or tongues 16 and 17.

Two forms of these devices have been shown and have been indicated respectively by the reference characters 25 and 30. The retaining device 25 includes a pair of longitudinally extending plates 26 which are provided with openings 27 arranged in staggered relation through which the tongues 16 and 17 are adapted to be extended, and the terminals of the tongues are then bent in opposite directions, as shown in Figure 2 of the drawings, over the outer surface of the plates 26. This, of course, firmly holds the plates 26 in engagement with the outer face of the tire casing and also prevents the accidental withdrawing of the prongs through the tire casing.

The retaining devices 30 have been shown in the nature of washers 31, and it is preferred that these washers 31 be of a substantially concavo-convex configuration and the same are provided with axially disposed openings 32 through which the prongs 16 and 17 are adapted to be inserted. After the prongs or tongues 16 and 17 have been inserted through the openings, the portions 19 thereof are bent in opposite directions, as clearly shown in Figure 4 of the drawings. These washers will also effectively prevent the accidental withdrawing of the prongs or tongues through the tire casing.

In use of the improved tire repair device, the plate 15 is adapted to be placed on the inner surface of a tire, directly over the blow out opening 14 therein, and the penetrating tongues 16 and 17 are driven through the tire casing on each side of the blow out openings as clearly shown in Figures 1, 2, 3, and 4. After the tongues 16 and 17 have been driven through the tire casing, either the devices 25 or 30 are utilized and the portions 20 of the prongs or tongues are bent as hereinbefore described. This will effectively prevent enlarging of the opening and prevent the entrance of dirt and like through the casing into engagement with the inner tube. If desired, an ordinary repair or blow out shoe may be utilized over the casing. This is, of course, not necessary. The opening 14 can be filled with any desired substance or raw rubber can be placed therein and vulcanized if preferred.

From the foregoing description it can be seeen that an improved and simple repair device has been provided for blow outs in tire casings, which will effectively hold the casing against further tearing or ripping and effectively prevent the entrance of foreign objects into the casing, which would tend to rupture the inner tube.

Changes in details may be made without departing from the spirit or scope of this invention; but,

We claim:

1. A tire repair device comprising a longitudinal extending plate having plane inner and outer faces, a plurality of penetrating prongs formed on the longitudinal edges of the plate, the prongs being disposed in transverse alignment, the plate being weakened transversely to permit the same to be divided into sections, the weakened portions of the plate being disposed intermediate the tongues.

2. A tire repairing device comprising a metallic plate, a plurality of penetrating prongs formed on the longitudinal edges of the plate arranged in staggered relation, the terminals of the prongs being slit, whereby the portions defined by said slits can be bent in opposite directions, one face of the plate being weakened by transversely extending grooves.

3. The combination with a tire casing having an opening therein, of a repair device for the casing including a plate, a plurality of penetrating tongues formed on the longitudinal edges of the plate arranged to extend through the casing on opposite sides of the opening therein, and retaining means for the prongs adapted to be placed on the opposite side of the tire casing from the plate and having openings therein to receive said prongs, the prongs being adapted to be bent at right angles into engagement with said means.

4. The combination with a tire casing having a blow out opening therein, of a repair device for the casing including a longitudinally extending plate weakened at predetermined intervals, a plurality of penetrating prongs formed on the longitudinal edges of the plate, retaining means for the prongs adapted to be disposed in engagement with the tire casing for receiving the terminals of the prongs, the terminals of the prongs having longitudinally extending slots therein defining bendable portions, the portions being bent into engagement with said means and extended in opposite directions in relation to each other.

5. A repair device for blow out openings in tires comprising a plate adapted to overlie the openings, a plurality of prongs formed on the longitudinal edges of the plate for insertion through the casing on opposite sides of the opening, the prongs being divided longitudinally to define a pair of bendable portions, the portions being adapted to be bent into opposite directions.

6. The combination with a tire casing having a blow out opening therein, of a repair device for the casing including a longitudinally extending plate, a plurality of penetrating prongs formed on the longitudinal edges of the plate for extension through the casing on opposite sides of the openings therein, and retaining means for the prongs disposed in engagement with the tire casing for receiving the prongs including a plurality of independent washers, the terminals of the prongs being bent at right angles into engagement with the washers.

7. The combination with a tire casing having an opening therein, of a repair device for the casing including a plate, a plurality of penetrating prongs formed on the plate for extension through the casing around said opening, and retaining means for the prongs engaging one face of the tire casing including a plurality of independent concavo-convex washers for the prongs, the terminals of the prongs being bent into engagement with the concave portions of said washers.

EDITH M. SIMPSON.
JAMES H. BUCKLES.